United States Patent [19]

Takahara et al.

[11] 4,436,646

[45] Mar. 13, 1984

[54] GREEN-EMITTING PHOSPHOR FOR CATHODE-RAY TUBE

[75] Inventors: Takeshi Takahara, Yokosuka; Takeo Sato; Takeo Itou, both of Fukaya; Masaaki Tamatani, Fujisawa, all of Japan

[73] Assignee: Shibaura Denki Kabushiki Kaisha, Kawasaki, Japan

[21] Appl. No.: 421,269

[22] Filed: Sep. 22, 1982

[30] Foreign Application Priority Data

Oct. 6, 1981 [JP] Japan ............................. 56-158218

[51] Int. Cl.$^3$ ........................................... C09K 11/463
[52] U.S. Cl. .............................. 252/301.4 S; 313/468
[58] Field of Search .................. 252/301.4 S; 313/468

[56] References Cited

U.S. PATENT DOCUMENTS 2,522,074  9/1950  Urbach ..................... 252/301.4 S
3,623,996  11/1971 Amster ..................... 252/301.4 S
4,348,299  9/1982  Okamoto et al. ......... 252/301.4 S

OTHER PUBLICATIONS

Fujita et al., "Japanese Journal of Applied Physics", vol. 19, No. 6, Jun. 1980, pp. 1063–1065.
Asano et al., "Chem. Abstracts", vol. 92, 1980, 101818c.
Lehman et al., "Chem. Abstracts", vol. 74, 1971, 118024S.

Primary Examiner—Jack Cooper
Attorney, Agent, or Firm—Cushman, Darby & Cushman

[57] ABSTRACT

A green-emitting phosphor for a cathode-ray tube contains calcium sulfide activated by cerium and lithium. Decreases in the brightness when the tube is excited with an electron beam of high current densities or is subjected to high temperatures are eliminated.

1 Claim, 2 Drawing Figures

GREEN-EMITTING PHOSPHOR FOR CATHODE-RAY TUBE

BACKGROUND OF THE INVENTION

The present invention relates to a green-emitting phosphor for a cathode-ray tube, in particular, of a projection video apparatus.

As shown in FIG. 1, a projection video apparatus comprises three projection cathode-ray tubes R, G and B which respectively emit red light, green light and blue light; lenses L for diverging the light rays from these tubes R, G and B, respectively; and a screen S for projecting the light rays emerging from these lenses, respectively.

In a projection video apparatus of this type, the phosphor screen of the cathode-ray tube is excited by an electron beam of a current density which is more than ten fold that of the conventional display cathode-ray tube. For this reason, the temperature of the phosphor screen is raised to 60° C. or higher during the normal operation. The brightness of the phosphor screen is known to decrease with an increase in the temperature.

As a green-emitting phosphor used for a cathode-ray tube of a projection video apparatus is conventionally known which comprises zinc silicate ($Zn_2SiO_4$:Mn) activated by manganese of gadolinium oxysulfide ($Gd_2O_2S$:Tb) activated by terbium.

However, upon being excited with an electron beam, the $Zn_2SiO_4$:Mn phosphor has a luminous efficiency which is as low as about 7%, and tends to cause degradation on the phosphor screen which is known as a burn. Although the $Gd_2O_2S$:Tb phosphor has a luminous efficiency of 10% or higher, it has inferior temperature characteristics.

SUMMARY OF THE INVENTION

It is an object of the present invention to provide a green-emitting phosphor for a cathode-ray tube which causes only a small decrease in brightness when it is excited with electron beams of high current densities or when it is subjected to high temperatures.

According to an aspect of the present invention, there is provided a green-emitting phosphor for a cathode-ray tube comprising calcium sulfide which is activated by cerium and lithium.

DETAILED DESCRIPTION OF THE PREFERRED EMBODIMENT

In order to develop a phosphor of excellent brightness characteristics for a cathode-ray tube which is used at high current densities or at high temperatures such as a cathode-ray tube for a projection video apparatus, the present inventors have conducted experiments on the known phosphors. A CaS:Ce-type green-emitting phosphor is known to have excellent brightness characteristics when it is adapted for a display cathode-ray tube. For example, Japanese Patent Publication No. 47-38747 discloses addition of phosphorus (P) or a halogen such as Cl, Br or I as a coactivator to a CaS:Ce-type phosphor in order to improve brightness.

The present inventors experimented on the use of a CaS:Ce phosphor optimal for a known display cathode-ray tube which is activated with a halogen or phosphorus in a projection cathode-ray tube having a high current density. However, satisfactory results were not obtained.

Figure 1:
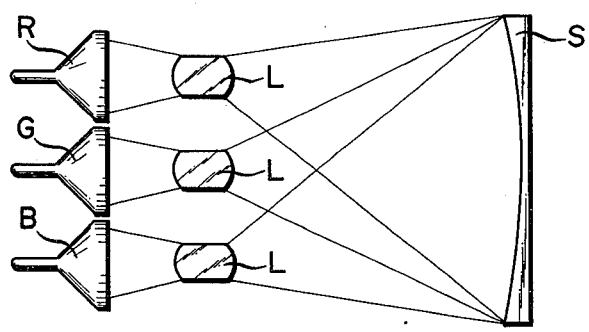
FIG. 1 is a schematic view of a projection video apparatus having a cathode-ray tube.
Figure 2:
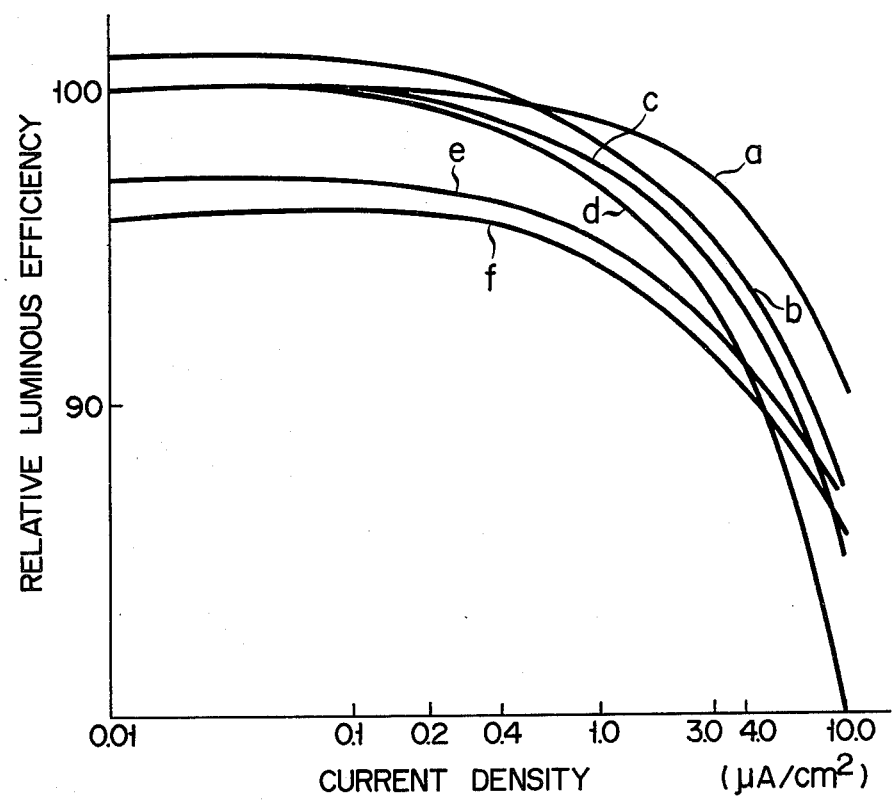
FIG. 2 is a graph showing the relative luminous efficiency as a function of a current density according to the prior art and the present invention.

Further experiments were conducted to examine various combinations of coactivators for the CaS:Ce phosphors. The CaS:Ce phosphors which were activated by a halogen or phosphorus in a conventional manner were found to have low luminous efficiencies when they were excited at a high current density. However, the CaS:Ce phosphors which were activated by lithium (Li) which is an alkali metal were found to have a small decrease in the luminous efficiency under use at high current densities. It was also found that this tendency is particularly notable with Li and is not so with sodium (Na) or potassium (K). FIG. 2 shows the light-emitting characteristics when the phosphors as described above are used in a phosphor screen of a projection cathode-ray tube. Referring to FIG. 2, curve a represents the characteristics of a phosphor activated with Ce and Li; curve b represents those of a phosphor activated with Ce and Cl; curve c represents those of a phosphor activated with Ce and Br; curve d represents those of a phosphor activated with Ce and P; curve e represents those of a phosphor activated by Ce and Na; and curve f represents those of a phosphor activated by Ce and K.

Referring to FIG. 2, the current density of a phosphor screen of a projection cathode-ray tube is plotted along the axis of abscissa, while the relative luminous efficiency obtained by division of the brightness of the phosphor screen by the current density is plotted along the axis of ordinate. The luminous efficiency of each phosphor is shown when that of a CaS:CeLi phosphor excited at a current density of 0.01 $\mu A/cm^2$ is defined as 100.

A conventional display cathode-ray tube generally has a current density of about 0.4 $\mu A/cm^2$ or less, while a projection cathode-ray tube generally has that of about 4 $\mu A/cm^2$ or less.

As may be seen from the graph shown in FIG. 2, the CaS:CeLi phosphor of curve a has a high relative luminous efficiency at a high current density and is thus suitable for use in a projection cathode-tay tube. However, with the phosphors corresponding to curves b to d which are obtained by activation with a halogen, phosphorus and the like have great decreases in the relative luminous efficiency at high current densities. The phosphors corresponding to curves e and f which are obtained by activation with Na, K and the like have small relative luminous efficiency even at low current densities.

The CaS:CeLi phosphor exhibits excellent light-emitting characteristics when the cerium concentration is within the range of 0.06 to 0.5 mol% and the lithum concentration is within the range of 0.05 to 0.4 mol%.

In order to examine the possible adverse effects of the halogens and phosphorus, the amounts of the halogen or phosphorus were varied. It was found that the luminous efficiency at high current densities may not be adversely affected if the concentration of a halogen element is 0.1 mol% or less and the phosphorus concentration is 0.05 mol% or less.

The present invention has been made on the basis of the experiments as described above and will be more fully understood from its examples below.

EXAMPLE 1

Five hundred grams of calcium carbonate and 1.55 g of cerium oxide were dissolved in nitric acid. Seven hundred grams of oxalic acid were added to the resultant mixture to precipitate calcium oxalate and cerium oxalate. The precipitate was rinsed with water and dried. To the dried precipitate were added 40 g of lithium carbonate and 220 g of sulfur under mixing. The resultant mixture was placed in a quartz crucible with a lid, and was sintered at 950° C. for 1 hour. The sintered material was sieved in water through a nylon mesh bag, rinsed with water, and dried. The dried material was sieved through a sieve of 500 mesh to provide a CaS:CeLi phosphor. The chemical analysis of the obtained phosphor revealed a Ce concentration of 0.17 mol% and a lithium concentration of 0.15 mol%.

In 100 ml of water were placed 0.75 g of the phosphor. Fifty cc of 25% water-glass were added to the resultant mixture under mixing to provide a suspension of the phosphor. Onto the inner surface of the faceplate of a 7" projection cathode-ray tube were poured 12 cc of a 2% barium nitrate solution and 800 ml of water. The suspension as described above was further poured and the cathode-ray tube was left to stand. After the phosphor precipitated to form a film, the supernatent was drained to form a phosphor screen. The obtained phosphor screen was subjected to lacquer filming to form an organic film. An aluminum film was deposited thereover. Baking, mounting of an electron gun, and evacuation were performed to complete the cathode-ray tube. When the cathode-ray tube was operated by electron beam excitation at an anode voltage of 28 kV and a current of 200 $\mu$A (about 2 $\mu$A/cm$^2$), the emitted light had coordinates X=0.322 and Y=0.575 in the CIE chromaticities. The brightness of the tube was about 20% higher than that of a tube using a conventional $Cd_2O_2S$:Tb phosphor.

EXAMPLE 2

In deionized water were dissolved 555 g of calcium chloride and 2.61 g of cerium chloride. To the resultant mixture were added 700 g of oxalic acid to precipitate calcium oxalate and cerium oxalate. The precipitate was rinsed with water and was dried. To the dried precipitate were added 40 g of lithium carbonate, 220 g of sulfur and 3 g of ammonium chloride under mixing. The resultant mixture was placed in a quartz crucible with a lid and was sintered at 950° C. for 1 hour. The similar treatments as described in Example 1 above were performed to provide a CaS:CeLi phosphor which had a Ce concentration of 0.13 mol%, a Li concentration of 0.1 mol%, and a Cl concentration of 0.05 mol%. A projection cathode-ray tube was completed through the same manufacturing process as in Example 1. The tube had a brightness 18% higher than that of a tube using a conventional $Cd_2O_2S$:Tb phosphor under electron beam excitation at an anode voltage of 28 kV and a current of 200 $\mu$A.

What we claim is:

1. A green-emitting phosphor for a cathode-ray tube, consisting of calcium sulfide activated by cerium and lithium, the cerium concentration being within the range of 0.06 to 0.5 mol % and the lithium concentration being in the range 0.05 to 0.4 mol % said phosphor exhibiting a higher luminous efficiency than calcium sulfide phosphor activated by cerium and sodium when excited at a current density of 4 $\mu$A/cm$^2$.

* * * * *

UNITED STATES PATENT AND TRADEMARK OFFICE
CERTIFICATE OF CORRECTION

PATENT NO. : 4,436,646
DATED : Mar. 13, 1984
INVENTOR(S) : TAKAHARA et al.

It is certified that error appears in the above—identified patent and that said Letters Patent is hereby corrected as shown below:

On the Cover Sheet,

[73] Assignee: should read --Tokyo Shibaura Denki Kabushiki Kaisha--.

Signed and Sealed this

Twenty-fourth Day of July 1984

[SEAL]

Attest:

GERALD J. MOSSINGHOFF

Attesting Officer     Commissioner of Patents and Trademarks